Dec. 5, 1967  C. F. EARLEY  3,356,913

ELECTROLYTIC CAPACITOR WITH COMPRESSION STRESSED SEAL CAP

Filed June 4, 1965

INVENTOR
CHARLES F. EARLEY
BY
ATTORNEY 3,356,913
ELECTROLYTIC CAPACITOR WITH COMPRESSION
STRESSED SEAL CAP
Charles F. Earley, Manville, R.I., assignor to Cornell-Dubilier Electric Corporation, Newark, N.J., a corporation of Delaware
Filed June 4, 1965, Ser. No. 461,474
7 Claims. (Cl. 317—230)

This invention relates to electrical capacitors and more particularly to end seal constructions therefor.

Electrolytic capacitors that are widely used include containers in which the capacitor section is constrained. The capacitor sections may be in the form of a wound roll of valve metal (as for example aluminum) foils and interleaved spacers with appropriately connected terminal tabs of valve metal extending from the roll. An electrolytic fill compatible with the valve metal fills the container and impregnates the capacitor section. Commonly employed electrolytes are corrosive and must be prevented from leaking from the capacitor. The associated electrolyte fill is retained in the container by appropriate end seals which incorporate conductive members providing connection between the capacitor section terminal tabs and the external circuitry with which the capacitor is utilized.

In electrolytic capacitors the metals used in the electrodes and connection thereto must be compatible with the electrolyte and with one another. Therefore, valve metal inserts in insulating plugs have been used as end seals in capacitors having metallic housings. The terminal tab of the wound section is connected to the inner end of the insert and a flexible solderable lead wire is connected to the other. A flexible solderable lead wire of non-valve metal is used to provide convenient means for making soldered connection of the capacitor to the end use circuit. Heretofore the connection between the lead in wire valve metal insert has been made by butt welding the lead wire to the insert and has been found to be a source of rejection due to failure of the joint. The connection is relatively fragile being easily damaged by the stresses produced by the flexing of the lead wires. Electrolyte leakage around the valve metal insert has caused serious problems, i.e. leakage of the corrosive electrolyte has caused failure of the other components associated therewith.

Therefore, it is an object of this invention to provide an improved end seal construction which obviates the above-mentioned defects.

It is still another object of this invention to provide electrolyte-tight end seals of simple construction.

It is a further object of the invention to provide improved stress resisting end seals for electrolytic capacitors.

It is another object of the invention to provide an end seal construction for electrolytic capacitors which construction utilizes valve and non-valve metals joined together to provide the conductive path through the end seal.

Figure 1:
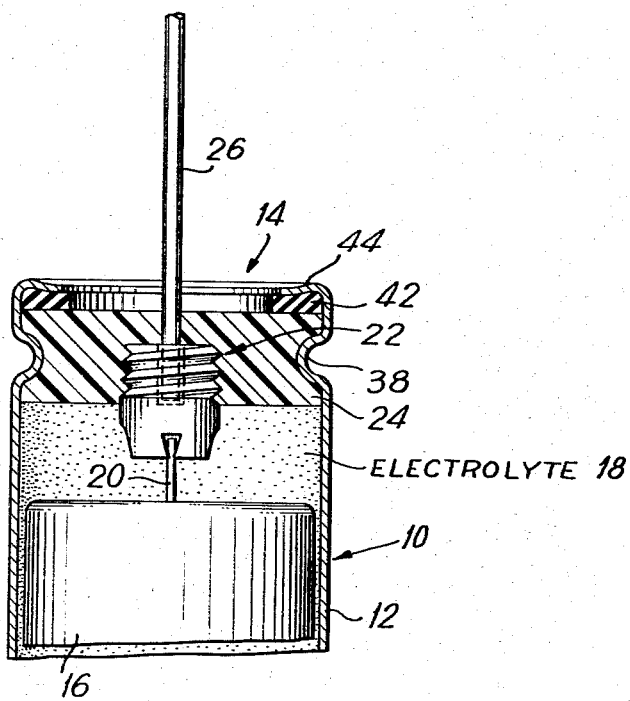
Figure 2:
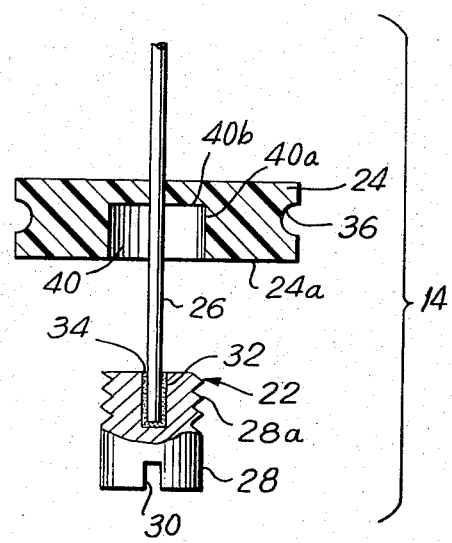

The above and other objects and advantages and novel features of the invention will become apparent from the following description taken in conjunction with the accompanying drawings in which FIG. 1 is a fragmentary section of a typical capacitor according to the invention; and FIG. 2 is a sectional view similar to that of FIG. 1 showing the end seal construction before insertion into and assembly with the capacitor winding and the associated housing.

Referring to FIG. 1 the presently preferred embodiment of the invention shown therein illustrates the end portion of an electrolytic capacitor 10 which includes a metallic container or casing 12, an end seal construction 14 and a capacitor body 16. The electrolyte 18 is chosen to be compatible with the metals used in the capacitor. The electrolyte surrounds and impregnates the capacitor body 16 and is retained within the casing 12 by the end seal construction 14. The end seal construction is duplicated at the remote end of the capacitor if it is of the non-polarized type (not shown). The casing 12 for such a capacitor is in the form of a tube. In polar or single-ended capacitors the casing 12 is in the form of a container open at one end, which open end is closed by the herein described end seal.

The capacitor body 16 includes a pair of foils of valve type, i.e., film-forming metal, such as aluminum which are connected to respective connecting terminal tabs 20 of the same metal (only one such tab is shown in the drawings). The foils are separated from one another by a porous insulator or spacer of paper and the foils and spacer are wound in the form of a roll by techniques well known in the art. The terminal tabs and respective foils are connected by well-known techniques such as welding and then each assembly of foil and riser is subjected to an anodic forming operation which produces the desired dielectric oxide layer. Anodic forming techniques are well known in the art and do not form part of the present invention and therefore will not be described in detail.

The header assembly 14 includes a stud-like member 22 of valve metal, an insulating member 24, and a flexible solderable lead wire 26. The stud 22 is made of the same valve metal that is used in the terminal tab and foils. Stud 22 may be anodically formed to produce the desired oxide layer on its surfaces prior to assembly or may be formed later by the open-aging process well known in the art. All metals which are electrically active in the capacitor must have a dielectric oxide coating thereon for the capacitor to be operative and to reduce outgassing and leakage currents. Stud 22 has a cylindrical body portion 28 which is threaded at 28a for engagement with the insulating member 24. One end of the stud has a transverse slot 30 formed therein for receiving the terminal tab 20 of the capacitor section 16. The other end of the stud 22 is formed to provide a lead wire receiving pocket 32. A significant length of lead wire is positioned in the pocket and is connected to the stud electrically and mechanically. I have found that secure connections of proper electrical and mechanical characteristics may be formed by bonding the lead wire to the stud by means of a thermosetting aluminum filled resin 34, such filled resins being commercially available under the tradename "Aluminum Solder." Alternatively the lead wire may be secured to the stud 22 by crimping the wire 26 within the pocket 32. The facing mutually engaged areas of the stud and wire are much greater than those which would be produced by butt-welding the wire to the stud. The resulting joint herein described is much more able to withstand the stresses produced by flexing the lead-wire.

The insulating member 24 is, in the preferred embodiment of the invention, fabricated from a resilient insulating plastomer such as polytetrafluoroethylene resin commercially available as Teflon. The Teflon member 24 is molded in the form of a disc having a continuous peripheral groove 36 for engagement by rolled in portion 38 of the casing 12 in the assembly of the completed unit. The inner face 24a of the disc has a cylindrical recess 40 formed therein with the side wall 40a perpendicular to the plane of the face 24a and a bottom wall 40b parallel to the plane of the face 24a. The recess 40 is provided for receiving the threaded portion 28a of the stud 22 and is of slightly smaller diameter than the body portion 28a of the stud so as to form an electrolyte tight seal therewith when the stud is screwed into the resilient disc. It is also contemplated that the Teflon disc 24 may be provided with a molded aperture 40 that is threaded to mate with the threaded portion 28a of the stud 22 to thereby form a seal therewith. The threaded engagement between the stud and the disc provides an extended area of forceful contact which reduces the possibility of leakage between the parts.

In assembling the end seal 14 a tinned copper lead wire 26, which has been joined to the stud, is driven through the center of the bottom wall 40b of the recess in the plastomer disc in a manner well known in the art. The stud 22 is then screwed into the recess 40 until the stud bottoms in the recess against the wall 40b. The threaded engagement between the stud and the disc provides a liquid tight or electrolyte tight seal between the plug and the Teflon disc 24. The effectiveness of the seal is enhanced by the bottoming of the stud in the recess. In another form of the invention the recess 40 may be provided with threaded side walls 40a for providing a similar threaded engagement sealing effect.

The capacitor section is then joined to the stud by crimping the foil tab 20 in the slot 30. The crimped connection yields adequate mechanical and electrical connection between the stud and the tab regardless of whether the stud or tab or both have been formed. The assembled end seal and capacitor section is introduced into the open ended casing 12 and a connection (not shown) is made between the other foil terminal tab and the casing. The capacitor is then vacuum impregnated with the electrolyte 18 which fills the casing.

Subsequently, the assembly of end seal and capacitor section is subjected to an open aging operation to form the desired oxide layer. Where the foils of the capacitor section and stud have been previously formed the aging operation repairs any defects in the oxide layer that may have been caused by the winding and assembly operations.

The impregnated and aged capacitor is then sealed. The side wall of the casing is rolled into the groove 36 as at 38. An elastomer ring 42 is positioned on the outer face of the Teflon disc 24 and the end of the casing 12 is rolled over the ring as at 44. The ring 42 and the locked groove 36 provide an effective seal between the disc and the casing as is well known in the art.

The extended area of engagement between the stud 22 and the disc 24 provide a highly reliable seal therebetween which resists leakage of the electrolyte and gasses generated during the operation of the capacitor. The improved joint between the flexible lead-in wire and the stud is capable of successfully withstanding the stresses produced by repeated flexing of the lead wire.

While only one embodiment of the invention has been shown and described in detail it will be apparent to those skilled in the art that various changes and modifications may be made without departing from the spirit and scope of the invention.

What is claimed is:

1. In an electrolytic capacitor comprising a wound capacitor section including at least one lead-in tab of valve metal, an open ended container for said wound section, said wound section being positioned in said container, and an electrolyte fill in said container, the combination with said section and said container of an end seal for retaining said electrolyte fill in said container, said end seal including a disc of resilient insulating material, said disc having inner and outer faces directed toward the interior and exterior of said container respectively, means defining a recess on the interior face of said disc, a stud-like member of valve metal having a body portion force-fit in said recess to provide a liquid tight seal therebetween, said stud-like member having a slotted head portion at one end and a lead wire receiving pocket at the other end, said slotted head portion extending above the inner face of said disc, a flexible lead-wire, means electrically and mechanically connecting said lead wire to said wire-receiving pocket of said stud-like member, said lead wire extending through said disc of insulating material beyond the exterior face thereof, said lead-in tab having a portion positioned within the slotted head portion of said stud-like member and being secured thereto by the forceful closing of said slot upon the tab, whereby said capacitor is provided with a flexible external lead wire for connecting of said capacitor and said lead wire is protected from the electrolyte fill in said container.

2. A capacitor in accordance with claim 1 wherein said lead wire connecting means is a thermosetting aluminum filled resin.

3. In an electrolytic capacitor comprising a wound capacitor section including at least one lead-in tab of valve metal, an open ended container for said wound section, said wound section being positioned in said container, and an electrolyte fill in said container, the combination with said section and said container of an end seal for retaining said electrolyte fill in said container, said end seal including a disc of resilient insulating material, said disc having inner and outer faces directed toward the interior and exterior of said container respectively, means defining a cylindrical recess on the interior face of said disc, a stud-like member of valve metal having a cylindrical body portion of greater diameter than the diameter of said cylindrical recess and having a length greater than the depth of said recess, said stud-like member having a slotted head portion at one end and a lead wire receiving pocket at the other end, said body portion of said stud-like member being in forceful engagement with the side walls of said recess with said slotted head portion extending above the inner face of said disc, a lead wire connected to the wire-receiving pocket of said stud-like member and extending through said disc of insulating material beyond the exterior face thereof, said lead-in tab having a portion positioned within the slotted head portion of said stud-like member and being secured thereto by the forceful closing of said slot upon the tab whereby said capacitor is provided with lead wire means for connection of said capacitor and the junction of said lead wire and said stud is protected from the electrolyte fill in said container.

4. In an electrolytic capacitor comprising a wound capacitor section including at least one lead-in tab of valve metal, an open ended container for said wound section, said wound section being positioned in said container, and an electrolyte fill in said container, the combination with said section and said container of an end seal for retaining said electrolyte fill in said container, said end seal including a disc of resilient insulating material, said disc having inner and outer faces directed toward the interior and exterior of said container respectively, means defining a threaded cylindrical recess on the interior face of said disc, a stud-like member of valve metal having a cylindrical body portion threadedly engaged with the threads of said recess to provide a liquid tight seal therebetween, said stud-like member having a slotted head portion at one end and a lead wire receiving pocket at the other end, said slotted head portion extending above the inner face of said disc, flexible lead wire of non-valve metal, means connecting said lead wire to said wire-receiving pocket of said stud-like member, said lead wire extending through said disc of insulating material beyond the exterior face thereof, said lead-in tab having a portion positioned within the slotted head portion of said stud-like member and being secured thereto by the forceful crimping of said lead upon said tab, whereby said capacitor is provided with external lead wire means for connection of said capacitor, the junction of said lead wire and said stud being protected from the electrolyte fill in said container and said junction is isolated from stresses produced by the flexing of said lead wire.

5. In a capacitor including a wound capacitor section comprising a convolutely wound assembly of valve-metal foils and spacers, a tab of valve metal forming a terminal for said capacitor section, an open-ended container for said capacitor section, and an electrolyte fill for said container, the improvement in end seals for said capacitor comprising an insulating member closing the end of said container, said insulating member having inner and outer faces directed toward the interior and exterior of said container respectively, means defining a recess in the inner face of said disc, a stud-like member of valve metal, said stud having a threaded body portion and a head portion at one end thereof, said threaded portion engaging the side walls of said recess to provide a liquid tight seal therebetween with the head portion of said stud being accessible for connection to said tab, said terminal tab of said capacitor section being connected to said head portion of said stud, a lead wire of non-valve metal connected to said body portion of said stud within said recess, said lead wire passing through the bottom of said recess beyond the outer face of said insulating member whereby said lead-in wire is protected from said electrolyte.

6. In a capacitor including a wound capacitor section comprising a convolutely wound assembly of valve-metal foils and spacers, a tab of valve metal forming a terminal for said capacitor section, an open-ended container for said capacitor section, and an electrolyte fill for said container, the improvement in end seals for said container comprising a resilient insulating member closing the end of said container, said insulating member having inner and outer faces directed toward the interior and exterior of said container respectively, a recess in the inner face of said disc defined by a cylindrical side wall perpendicular to the face and a bottom wall parallel to the plane of said face, a stud-like member of valve metal, said stud having a threaded body portion, a head portion and lead wire receiving pocket, said threaded portion filling said recess and being in forceful engagement with the side walls of said recess to provide a liquid tight seal therebetween, said terminal tab of said capacitor section being crimped to said head portion of said stud, a lead-in wire of non-valve metal, means connecting said lead wire to said lead wire receiving pocket of said stud within said recess, said lead wire passing through the bottom wall of said recess beyond the outer face of said insulating member, said lead wire being in force-fit relation with said insulating member whereby said lead-in wire is protected from said electrolyte and said lead wire connecting means is isolated from stresses produced by flexing of said lead wire.

7. In a capacitor including a wound capacitor section comprising a convolutely wound assembly of valve metal foils and spacers, a tab of valve metal forming a terminal for said capacitor section, an open-ended container for said capacitor section, and an electrolyte fill for said container, the improvement in end seals for said container comprising an insulating member closing the end of said container, said insulating member having inner and outer faces directed toward the interior and exterior of said container respectively, a means defining a threaded recess in the inner face of said disc, a stud-like member of valve metal, said stud having a threaded body portion corresponding to the thread pitch of said recess, said stud having a head portion, said threaded body portion engaging said threaded recess and being in multi-turn engagement therewith to provide a liquid tight seal, said terminal tab of said capacitor section being connected to said head portion of said stud, a lead wire of non-valve metal, means connecting said lead wire to said body portion of said stud within said recess, said lead wire passing through the insulating member at the bottom of said recess and extending beyond the outer face of said insulating member whereby said lead-in wire is protected from said electrolyte and said lead wire connecting means is isolated by said insulating member from stresses produced by flexing of said lead wire.

References Cited
UNITED STATES PATENTS

| | | | |
|---|---|---|---|
| 2,225,801 | 12/1940 | Schnoll | 317—230 |
| 2,309,563 | 1/1943 | Abeel | 317—230 |
| 3,307,085 | 2/1967 | Ross | 317—230 |

JAMES D. KALLAM, *Primary Examiner.*